Oct. 31, 1944.  N. KRAFT  2,361,775
CHEESE PRODUCTION
Filed March 29, 1940  3 Sheets-Sheet 1
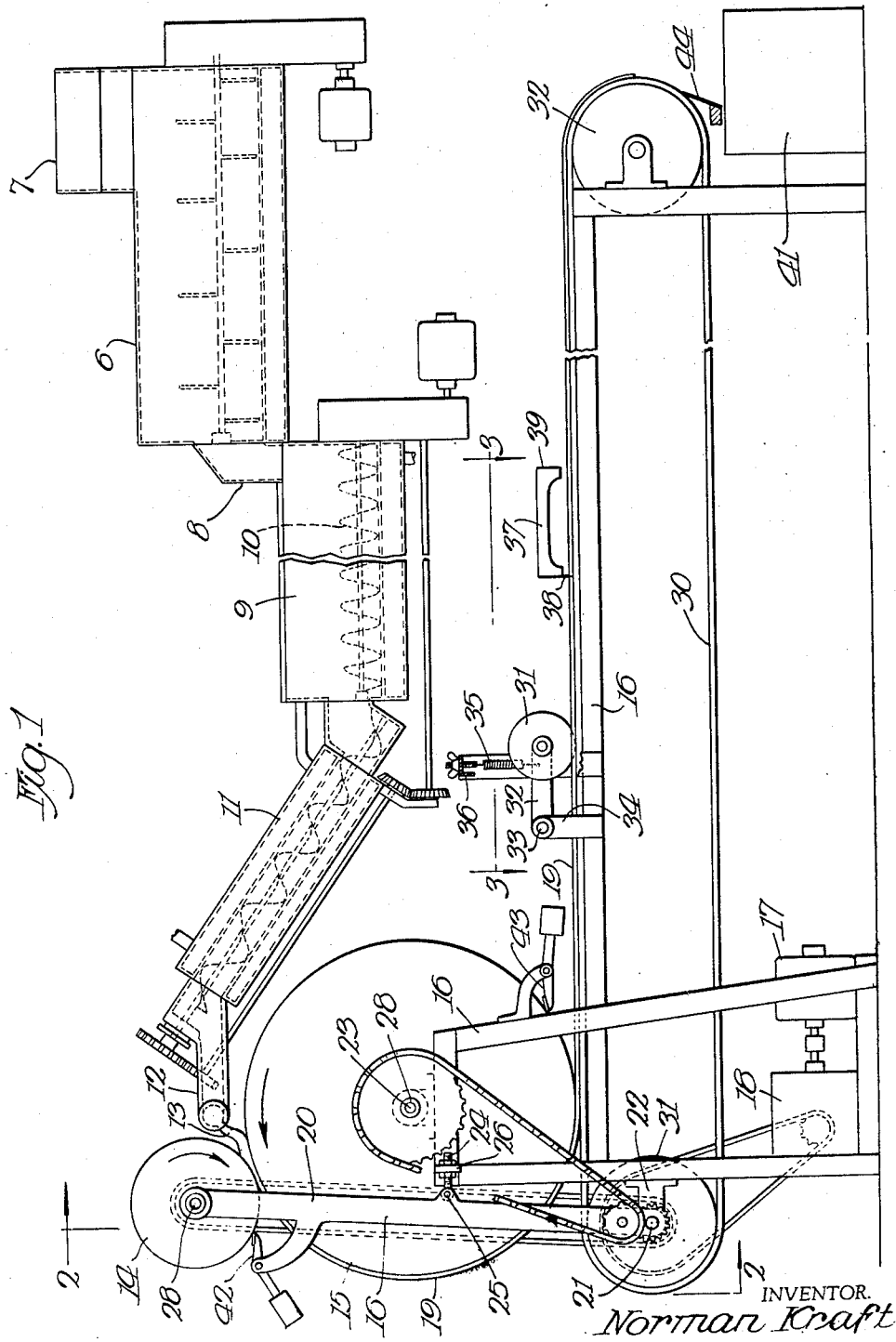

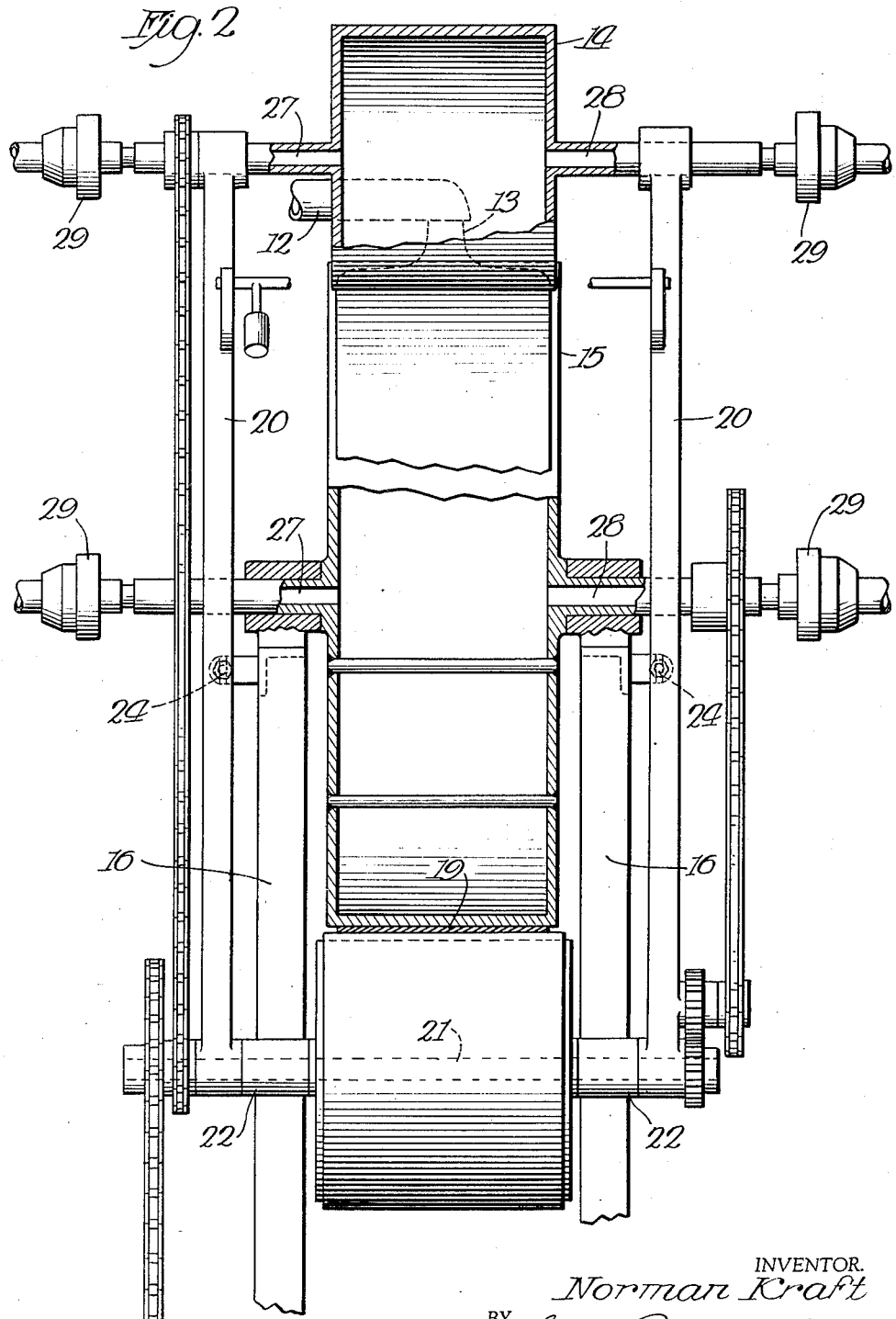

Oct. 31, 1944.   N. KRAFT   2,361,775
CHEESE PRODUCTION
Filed March 29, 1940   3 Sheets-Sheet 3
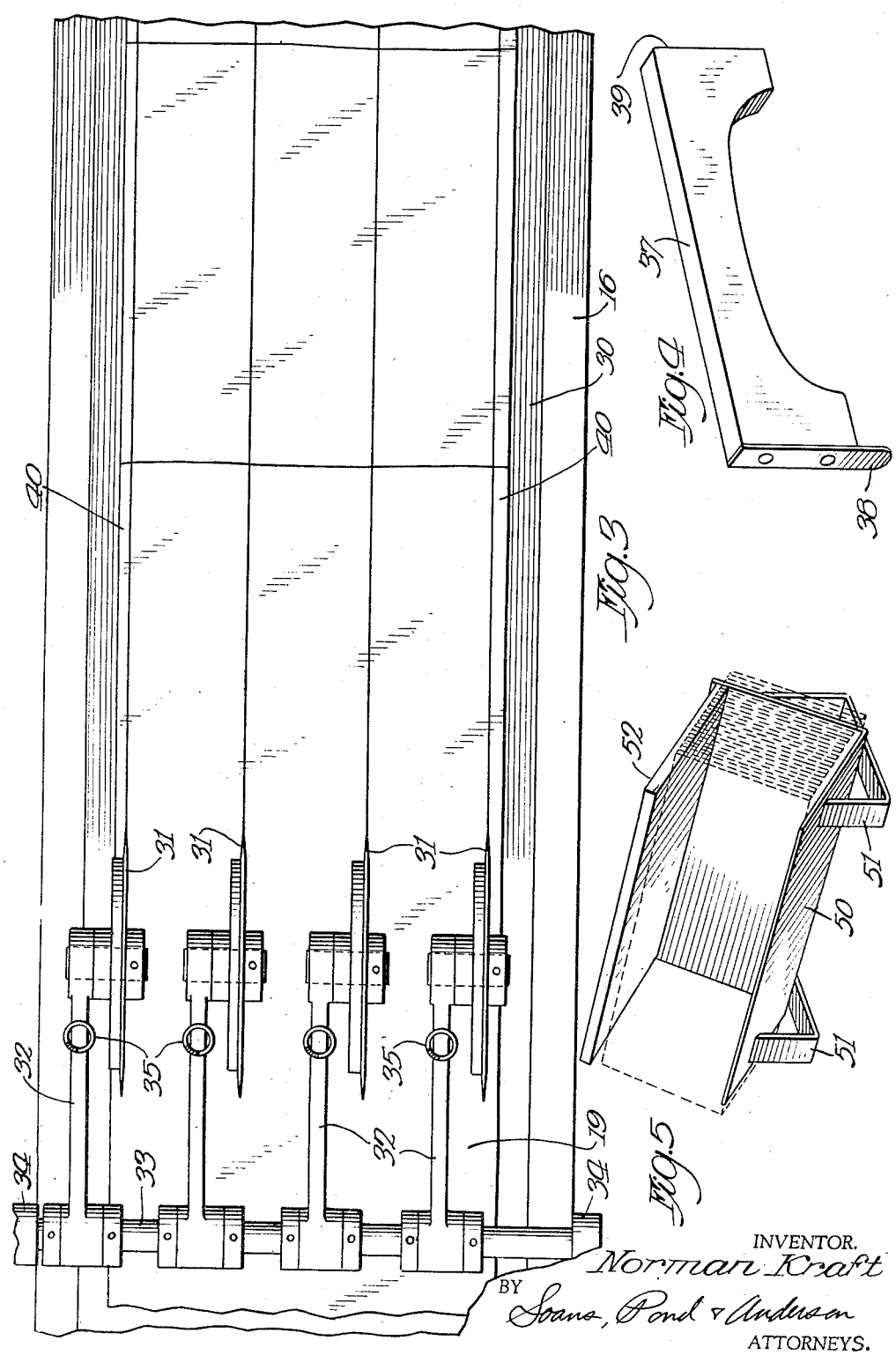
INVENTOR.
Norman Kraft
BY
Soans, Pond & Anderson
ATTORNEYS.

Patented Oct. 31, 1944

2,361,775

UNITED STATES PATENT OFFICE 2,361,775

CHEESE PRODUCTION

Norman Kraft, Wilmette, Ill., assignor to Kraft Cheese Company, Chicago, Ill., a corporation of Delaware Application March 29, 1940, Serial No. 326,554

7 Claims. (Cl. 31—89)

This invention relates to improvements in cheese production and has particular reference to the production and packaging of "process" cheese in thin sheet or leaf form, the sheets or leaves being advantageously made of such thickness as to be well suited for serving and sandwich making.

The main objects of the invention are to provide cheese in thin leaf or sheet form initially manufactured in such form as to obviate the necessity of manually or otherwise slicing a loaf of cheese; to provide cheese in said form so treated that it will more effectively tend to resist drying than does ordinary sliced cheese; to provide cheese having identifying markings impressed therein or thereon; to provide a processed cheese of improved body texture and flavor; to provide a substantially continuously operating method and apparatus for producing cheese in said thin sheet-like form whereby efficiency and economy in production are promoted; to provide a commercially practicable method and apparatus for assembling the sheets or leaves of cheese into a multi-layer form suitable for packaging in accordance with existing packaging standards; and in general it is the object of the invention to provide an improved form of cheese together with means for commercially producing and packaging the same.

Other objects and advantages of the invention will be understood by reference to the following specification and accompanying drawings (three sheets) wherein there are disclosed the production and packaging of the improved form of cheese by a selected, commercially practicable method and apparatus.

In the drawings:

Fig. 1 is a more or less diagrammatic side elevation of apparatus for producing cheese according to the present invention;

Figs. 2 and 3 are sections on an enlarged scale, on the lines 2—2, and 3—3, respectively, of Fig. 1;

Fig. 4 is a perspective of a manually operated cutting device; and

Fig. 5 is a perspective of a rack for stacking the improved cheese preparatory to wrapping and packaging of the same.

Referring now to the drawings, there is schematically illustrated in Figure 1 a cheese cooking vat designated 6, the same being adapted to be charged through an inlet 7 and to discharge the cooked cheese through an outlet 8 which, in this instance, communicates with a temporary storage or cooling vat 9. The vat 9 is equipped with a suitable conveyor designated 10 which is so driven as to expel the cooked material into a conveyor 11 which carries the cooked cheese to a discharge nozzle 12. It will be understood that the cooker 6, vat 9 and conveyor 11 may be subjected to temperature controls by means of steam jackets or any other suitable means, the details of which form no part of the present invention and which details are generally known in the art.

The nozzle 12 is adapted to discharge cheese as indicated at 13 in a relatively small stream, in this instance a stream of about one and one-half inches or two inches in diameter. Suitable valve means (not shown) may be provided in connection with the nozzle 12 for stopping the flow of cheese when desired.

The stream 13 of cheese is delivered into the bite of a pair of rolls 14 and 15, respectively, the same being rotatably mounted in suitable frame work designated in its entirety 16. Said rolls 14 and 15 are driven in opposite directions so as to cause the cheese delivered to them to pass between them and emerge in a thin sheet form on the surface of the lower roll 15 which is of considerably larger diameter than the upper roll 14.

The rolls 14 and 15 are preferably driven at the same surface speed by suitable sprocket and chain connections such as illustrated to an electric driving motor 17, the chain of driving connections preferably including a speed drive unit 18 of any suitable form, many of which are commercially available. The speed at which the rolls 14 and 15 are driven should be adjusted relative to the rate of delivery of the stream 13 of the cheese, so that there will at all times be sufficient cheese delivered to the rolls to form a full width web or sheet on the surface of the lower roll 15. Such web or sheet is indicated at 19 and its thickness may be varied by adjusting the spacing of the rolls 14 and 15. As an example, one practical thickness of the cheese sheet 19 would be about one-sixteenth inch. Such thickness, however, may be varied as may be desired.

The arrangement herein shown for controlling the spacing between the rolls 14 and 15 comprises the mounting of the roll 14 in the upper or free ends of the frame arms 20, 20, the latter being pivotally mounted at their lower ends on a shaft 21 which is carried by suitable journal brackets such as indicated at 22 carried by the frame 16.

Rocking movement of the frame arms 20 toward and from the axis of the shaft 23 which carries the roll 15 is controlled by a screw threaded member 24 which is pivotally connected as shown at 25 to each arm 20. Such screw member 24 is longitudinally slidable through an apertured ear 26 carried by the frame 16, and is adapted to be locked in adjusted position relative thereto by lock nuts carried by the screw member on opposite sides of said ear. It will be seen that by adjustment of the screw members 24 in the ears 26, the arms 20, 20 will be adjusted toward or from the axis of the roll 15 and that thereby the roll 14 will be adjusted toward or from the roll 15. It will also be observed that the independent adjustment of the arms 20, 20 permits accurate adjustment of the roll 14 into axial parallelism with the roll 15 so as to permit the production of a cheese sheet of uniform thickness throughout its width.

The rolls 14 and 15 are preferably hollow and, as shown in Figure 2, are provided with axially located connections 27 and 28 on opposite sides thereof which are adapted to be connected with refrigerating equipment which will serve to cause a suitable refrigerant to circulate through the respective rolls so as to chill the cylindrical surfaces thereof. Any suitable form of swivel connections indicated more or less schematically at 29 may be employed for connecting the refrigerating apparatus to the respective rolls.

The cheese when in the stream 13 is in such a molten state that it will flow with sufficient freedom to spread itself to the width of the rolls 14 and 15.

Because of the thickness of the cheese sheet produced by the rolls and the chilling of the rolls as already explained, the cheese in the sheet is sufficiently cooled incident to its passage between the rolls to become sufficiently set to resist further spreading and to maintain the thickness which passes between the rolls 14 and 15. However, the cheese is nevertheless sufficiently flexible to permit its being straightened out from the curvature of the roll 15 from which it is delivered to a continuously driven endless conveyor belt 30.

The conveyor belt 30 is carried by suitable rolls 31 and 32 suitably mounted on the frame 16 and driven by the driving motor 17 through the connections illustrated in Figure 1. Said belt is driven in a direction to receive and carry away from the roll 15 the cheese sheet 19. The cheese sheet 19 is carried by said conveyor beneath suitable slitters 31 (see Figures 1 and 3) which may be arranged in such spaced relation as to slit the cheese into strips of predetermined width.

The slitters 31 in this instance are in the form of sharp edged discs rotatably mounted on the free ends of arms such as indicated at 32, the latter being pivotally mounted at their opposite ends on a shaft 33 carried by end brackets such as 34, the latter being secured to the frame 16.

The weight of the slitter discs 31 is sufficient to cause them to cut through the cheese sheet and it is preferable that counter-balancing means be provided to prevent such slitters from bearing on the conveyor belt 30 with a cutting pressure. In this instance, such counter-balancing means comprises helical springs 35 stretched between the arms 32 and a suitable cross member 36 carried by posts or brackets secured to the frame 16. The vertical position of the springs 35 may be subject to adjustment by any suitable means such as illustrated so as to facilitate accurate adjustment of the pressure with which the cutting discs bear on the belt 30.

The slitted sheet continues its travel on the belt 30 and is subjected to a cross cutting operation, which, for present purposes, may be described as a manual operation performed by means of a cutting device such as best illustrated in Figure 4.

The cutting device illustrated in Figure 4 comprises a handle part 37 and a knife part 38, the lower end of which is suitably sharpened to facilitate its passage through the cheese sheet. The length of the handle member 37 is preferably such that the operator may gauge the position of the transverse cut by locating the free end 39 of the handle approximately in alignment with the end of the cheese sheet or slightly inwardly thereof. Then by drawing the cutting device across the cheese sheet, the knife part 38 will sever the strips of cheese into sections of predetermined length.

The sections of cheese thus cut to predetermined length and width are then manually removed from the conveyor belt 30 and stacked in face to face, superposed relation in a rack such as illustrated in Figure 5. The rack there shown consists of an angle member 50 of predetermined length somewhat shorter than the length of the sections cut from the cheese sheet. The rack may be supported in the angular position illustrated by any suitable form of legs or supporting means such as indicated at 51 and the width of the flanges forming the angle member is preferably greater than the corresponding dimension of the cheese leaves or sections and depth of the package to be formed.

The sections are placed in the rack with end portions extending beyond both ends of the rack and when a sufficient number of the sections have been assembled in this manner, the ends of the assemblage are trimmed off into alignment with the ends of the rack, the latter being employed as guides for this trimming operation. To assist in the trimming operation there is provided a trimming guide board 52 which may be separable from the rack 50 or hinged at its lower edge to the marginal portion of one flange of the rack. Said trimming guide 52 correspondings in length to the length of the angle member and is so positioned relative to the latter that the ends of the trimming guide are aligned with the ends of the angle member. The width of the trimming guide is greater than the corresponding dimension of the assemblage of cheese leaves so that a suitable trimming knife may be placed against the corresponding ends of the trimming guide 52 and the parallel wall of the angle member 50. Both ends of the assemblage of cheese leaves may be thus trimmed. The assemblage is thus provided with smooth ends and is then ready for wrapping and packaging in accordance with any desired form.

It may be observed that in assembling the cheese sheet sections in the rack shown in Figure 5, there is no difficulty experienced in placing the sheets in accurately aligned relation so far as their side edges are concerned, such positioning being definitely guided by engagement of edges of the sheets with one of the walls of the angle member. However, greater difficulty is experienced in positioning the sections with their ends accurately aligned, and furthermore because of the manual cross cutting of the sheet the ends of the sections are not necessarily cut squarely. Hence it is not always possible to assemble the sheets into the form of a loaf with the ends of the sections registering smoothly with each other. Accordingly, the sections are initially cut slightly longer than the desired finished length, assembled and trimmed in the manner explained.

The trimmings from the ends of the assemblage may be collected and returned to the cooker 6 to be re-melted. Similarly, edge strips such as indicated at 40, 40 which are trimmed from the sheet of cheese by the outermost slitter 31 may be collected in a container 41 into which they are delivered by the conveyor 30 and such trimmings also returned to the cooker 6 to be re-melted and mixed into the cheese, ultimately to be again delivered to the sheet-forming apparatus.

Suitable doctor blades such as indicated at 42, 43 and 44 may be provided for insuring stripping of cheese from the rolls 14 and 15 and from the conveyor 30. Normally, such strippers are not required to remove cheese from the various parts since the cheese tends to fall away from the rolls, evidently because of a non-adhesive characteristic produced on the surfaces of the cheese sheets incident to the formation thereof into sheet form by the means described.

It appears that the said non-adhesive characteristic results from the quick chilling of the cheese by the refrigerated rolls 14 and 15 and the calendering effect of the said rolls. The cheese sheet formed by the mechanism explained has a more or less glossy, smooth finish on its faces. Said surfaces appear to be relatively impervious or non-porous and they tend to retard drying out of the cheese sheet and to seal in the flavor of the freshly produced cheese. Furthermore, the smooth, glossy finish of the sheets or leaves of cheese thus formed adds a quality of attractiveness or pleasing appearance to the product and enhances its desirability for table service.

The rapid cooling of the cheese after it has been heated to the proper temperature required for processing is effective in producing a process cheese of unimpaired body texture and flavor.

By suitably engraving or embossing one or more of the forming rolls, an identifying mark or pattern may be formed on or in the surface of the product.

In the disclosed embodiment of apparatus for producing a cheese in sheet or leaf form, the roll 15 is about thirty-two inches in diameter by about twelve inches in width. The cheese sheet formed on such roll is slightly more than three times the width of a present standard cheese loaf which permits the sheet to be slitted into three strips in the manner already explained.

It will be apparent that the stated dimensions are merely by way of example and not essential to the practice of the disclosed invention. Other changes may also be made without departing from the principles of the invention, the scope of which should be determined by reference to the following claims, the same being directed to the important principles of the invention herein disclosed and intended to be accordingly construed.

I claim:

1. The method of producing and packaging cheese which consists in passing a quantity of cheese in plastic condition between means to form a cheese sheet, slitting the sheet into sections of predetermined size and shape, assembling a plurality of such sections in face to face relation, and wrapping the assemblage.

2. The method of producing and packaging cheese which consists in passing a quantity of cheese in plastic condition between means to form a cheese sheet, slitting the sheet into sections of predetermined size and shape, assembling a plurality of such sections in face to face relation, trimming off the ends of the assemblage to provide smooth, even ends, and wrapping the assemblage.

3. The method of producing and packaging cheese which consists in passing soft plastic cheese between means to form a cheese sheet, continuously slitting the sheet into strips of predetermined width, cutting the strips transversely into predetermined lengths, assembling a plurality of such lengths in face to face relation, and wrapping the assemblage.

4. The method of producing sheet form cheese of the character described which consists in rolling a quantity of fluid cheese into sheet form on a chilled supporting surface, thereby to form a smooth-surfaced, self-sustaining cheese sheet.

5. The method of producing sheet form cheese which consists in passing a quantity of cheese in hot, fluid condition between pressure rolls to mold the fluid cheese into a smooth-surfaced cheese sheet, and cooling one of the rolls to thereby cool and set the cheese sheet on such roll.

6. The method of producing cheese which consists in passing a quantity of hot, fluid cheese through chilled means to form the cheese into a self-sustaining sheet, slitting the sheet into ribbons of predetermined width, and cutting the ribbons into packageable lengths.

7. The method of producing cheese in sheet form with a smooth-finished face to reduce adhesiveness and of such thickness as to be adapted, without slicing the thickness, for sandwich making and table service and which consists in pressing a mass of cheese in fluid condition into sheet form and chilling the sheet so as to set the same.

NORMAN KRAFT.